United States Patent
Ishihara (10) Patent No.: US 8,634,837 B2
(45) Date of Patent: *Jan. 21, 2014

(54) WIRELESS TERMINAL DEVICE, CONTROL METHOD AND CONTROL SYSTEM

(75) Inventor: Futoshi Ishihara, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 111 days.

This patent is subject to a terminal disclaimer.

(21) Appl. No.: 13/313,229

(22) Filed: Dec. 7, 2011

(65) Prior Publication Data

US 2012/0142358 A1 Jun. 7, 2012

(30) Foreign Application Priority Data

Dec. 7, 2010 (JP) ................................ 2010-272628

(51) Int. Cl.
*H04W 40/00* (2009.01)

(52) U.S. Cl.
USPC ..... 455/445; 455/448; 455/435.2; 455/435.1; 455/443; 455/436

(58) Field of Classification Search
USPC .............. 455/445, 443, 442, 436, 448, 435.2, 455/435.1; 370/350, 503, 507, 331
See application file for complete search history.

(56) References Cited

U.S. PATENT DOCUMENTS

| 2010/0008328 | A1* | 1/2010 | Maheshwari et al. | 370/331 |
| 2011/0300859 | A1* | 12/2011 | Takeda | 455/426.1 |
| 2012/0040672 | A1* | 2/2012 | Chin et al. | 455/436 |
| 2012/0040674 | A1* | 2/2012 | McGilly et al. | 455/436 |

FOREIGN PATENT DOCUMENTS

JP 2009-267996 11/2009

OTHER PUBLICATIONS

3GPP TS 23.272 V10.1.0, "Circuit Switched (CS) fallback in Evolved Packet System (EPS); Stage 2," Sep. 2010.

* cited by examiner

*Primary Examiner* — Khalid Shaheed
(74) *Attorney, Agent, or Firm* — Hoffmann &n Baron, LLP (57) ABSTRACT

A cellular telephone device includes: a synchronization unit that establishes synchronization with a base station of a CDMA system beforehand to obtain synchronization information for establishing synchronization with the base station; a storage unit that stores the synchronization information; and a switching unit that establishes synchronization with a base station in a calling zone of the CDMA system corresponding to a calling zone of an LTE system based on the synchronization information, in a case in which a communication request occurs in the CDMA system in a state where a location registration is performed in the LTE system.

6 Claims, 6 Drawing Sheets

WIRELESS TERMINAL DEVICE, CONTROL METHOD AND CONTROL SYSTEM

This application is based on and claims the benefit of priority from Japanese Patent Application No. 2010-272628, filed on 7 Dec. 2010, the content of which is incorporated herein by reference.

BACKGROUND OF THE INVENTION

1. Field of the Invention

The present invention relates to a wireless terminal device capable of communicating in a plurality of communication systems, and a control method and a control system for such a wireless terminal device.

2. Related Art

In recent years, in addition to a communication system of a CS (Circuit Switched) standard (for example, CDMA), a communication system of an LTE (Long Term Evolution) standard has been introduced as a communication system utilized by a wireless terminal device such as a cellular telephone device.

A CS Fallback function is defined in 3GPP TS 23.272, and by way of this function, an incoming call request from the CDMA can be reported via the LTE system (for example, see Japanese Unexamined Patent Application, Publication No. 2009-267996, and 3GPP TS 23.272 V10.1.0, "Circuit Switched (CS) fallback in Evolved Packet System (EPS), Stage2" 2010-09).

SUMMARY OF THE INVENTION

An object of the present invention is to provide a wireless terminal device, a control method and a control system, which perform highly convenient communication.

The wireless terminal device according to the present invention is a wireless terminal device that performs wireless communication in any one of a first communication system or a second communication system, the wireless terminal device comprising: a synchronization unit that establishes synchronization with a base station of the second communication system beforehand to obtain synchronization information for establishing synchronization with the base station; a storage unit that stores the synchronization information; and a switching unit that establishes synchronization with a base station in a calling zone of the second communication system corresponding to a calling zone of the first communication system based on the synchronization information, in a case in which a communication request occurs in the second communication system in a state where a location registration is performed in the first communication system.

Moreover, the switching unit preferably reports a communication request to the second communication system via the first communication system.

In addition, the switching unit preferably establishes synchronization with the base station by using channel information of a communication channel in the second communication system reported via the first communication system.

Furthermore, the switching unit preferably establishes synchronization with the base station in a calling zone of the second communication system corresponding to a calling zone of the first communication system, based on mapping data of a CS Fallback function maintained in the first communication system and defined in 3GPP TS 23.272.

The control method according to the present invention is a control method for a wireless terminal device that performs wireless communication in any one of a first communication system or a second communication system, and the method includes: a synchronizing step of establishing synchronization with a base station of the second communication system beforehand to obtain synchronization information for establishing synchronization with the base station; a storing step of storing the synchronization information; and a switching step of establishing synchronization with a base station in a calling zone of the second communication system corresponding to a calling zone of the first communication system based on the synchronization information, in a case in which a communication request occurs in the second communication system in a state where a location registration is performed in the first communication system.

The control system according to the present invention is a control system including: a wireless terminal device that performs wireless communication with a base station by way of any one of a first communication system or a second communication system; a base station of each of the communication systems; and a control unit that controls wireless communication in the base station of each of the communication systems and the wireless terminal device includes: a synchronization unit that establishes synchronization with a base station of the second communication system beforehand to obtain synchronization information for establishing synchronization with the base station; a storage unit that stores the synchronization information; and a switching unit that establishes synchronization with a base station in a calling zone of the second communication system corresponding to a calling zone of the first communication system based on the synchronization information, in a case in which a communication request occurs in the second communication system in a state where a location registration is performed in the first communication system, in which a control unit of the first communication system stores mapping data of a CS Fallback function defined in 3GPP TS 23.272, determines a control unit in a calling zone of the second communication system corresponding to a calling zone of the first communication system based on the mapping data, and transmits report data on the communication request from the wireless terminal device to the control unit of the second communication system, or from the control unit of the second communication system to the wireless terminal device.

According to the present invention, highly convenient communication can be performed in a wireless terminal device.

DETAILED DESCRIPTION OF THE INVENTION

A description is provided hereinafter for an example of a preferred embodiment of the present invention. It should be noted that, in the present embodiment, a cellular telephone device 1 is described as an example of a wireless terminal device.

Figure 1:
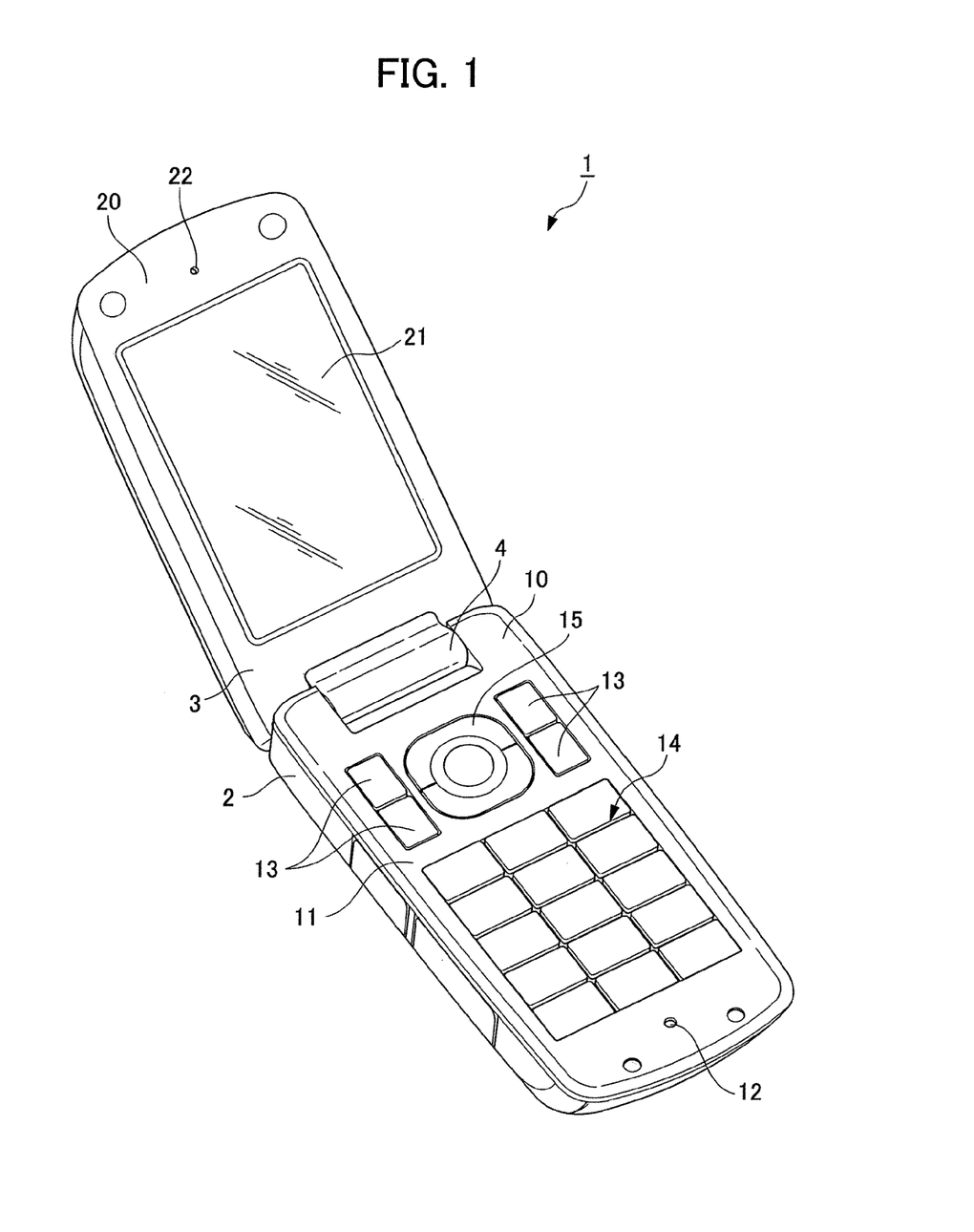
FIG. 1 is a perspective view showing an appearance of a cellular telephone device according to an embodiment of the present invention.

FIG. 1 is a perspective view showing an appearance of the cellular telephone device 1 according to the present embodiment.

It should be noted that, although FIG. 1 shows a so-called folder-type cellular telephone device, the cellular telephone device according to the present invention is not limited thereto. For example, the cellular telephone device may be of: a slider type in which one of the bodies slides to one direction in a state in which the bodies are mutually superimposed; a rotating (turning) type in which one of the bodies is rotated around an axis line along the direction of superimposing the bodies; and a type (straight type) in which an operation unit and a display unit are disposed in one body without having a connecting portion.

The cellular telephone device 1 is configured to include an operation unit side body 2 and a display unit side body 3. The operation unit side body 2 is configured to include, on a front face portion 10 thereof, an operation unit 11 and a microphone 12 to which sound produced by a user of the cellular telephone device 1 is input when the user is making a phone call or using a speech recognition application. The operation unit 11 is configured with: function setting operation buttons 13 for operating various functions such as for various setting functions, a telephone number directory function and a mail function; input operation buttons 14 for inputting the digits of a telephone number and characters for mail, etc.; and a selection operation button 15 for performing selection of various operations, scrolling, etc.

Moreover, the display unit side body 3 is configured to include, on a front face portion 20, a display unit 21 for displaying a variety of information, and a receiver 22 for outputting sound of the other party of the conversation.

In addition, an upper end portion of the operation unit side body 2 and a lower end portion of the display unit side body 3 are connected via a hinge mechanism 4. Furthermore, the cellular telephone device 1 can be arranged into a state where the operation unit side body 2 and the display unit side body 3 are apart from each other (opened state), and into a state where the operation unit side body 2 and the display unit side body 3 are contacting each other (closed state), by relatively rotating the operation unit side body 2 and the display unit side body 3, which are connected via the hinge mechanism 4.

Figure 2:
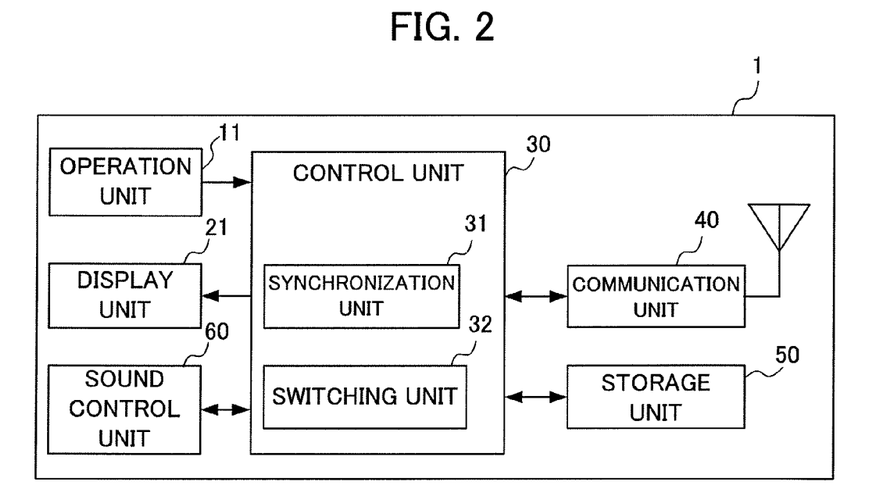
FIG. 2 is a block diagram showing functions of the cellular telephone device according to the embodiment of the present invention.

FIG. 2 is a block diagram showing functions of the cellular telephone device 1 according to the present embodiment.

The cellular telephone device 1 includes the operation unit 11, the display unit 21, a control unit 30, a communication unit 40, a storage unit 50, and a sound control unit 60.

The control unit 30 controls the entirety of the cellular telephone device 1, and performs, for example, predetermined control of each unit such as the display unit 21 and the communication unit 40. Moreover, the control unit 30 accepts input from the operation unit 11, the communication unit 40, etc. to perform a variety of processing. In addition, when executing such processing, the control unit 30 controls the storage unit 50 to read various programs and data and write data. It should be noted that detailed functions of the control unit 30 according to the present embodiment will be described later.

The communication unit 40 communicates with external devices (base stations) at a predetermined usable frequency band (for example, 2 GHz band, 800 MHz band, and the like). Furthermore, the communication unit 40 performs demodulation processing on a signal received via the antenna and provides the signal thus processed to the control unit 30, and in addition, performs modulation processing on a signal provided from the control unit 30 and transmits the signal to an external device via the antenna.

Here, in the present embodiment, the communication unit 40 conforms to both the W-CDMA or CDMA2000_1x (hereinafter referred to as CDMA) standard that is a communication protocol for audio and data communication, and the LTE standard that is a communication protocol mainly used for high speed data transmission; therefore, the communication unit 40 can perform communication in a communication system of either protocol. Based on an instruction from the control unit 30, the communication unit 40 communicates with a base station through any of the protocols. It should be noted that the cellular telephone device 1 shall perform communication preferentially through an LTE system (a first communication system) by way of the LTE standard when performing data communication, and shall switch to a CDMA system (a second communication system) by way of the CDMA standard when performing a voice call.

The storage unit 50 includes, for example, working memory, and is utilized for arithmetic processing by the control unit 30. Moreover, the storage unit 50 stores various programs and the like according to the present embodiment. Furthermore, the storage unit 50 stores system time information of the CDMA system while utilizing the LTE system. More specifically, the storage unit 50 stores difference between the system time of the LTE system and the system time of the CDMA system. In addition, when performing handoff from the LTE system to the CDMA system, the control unit 30 calculates system time for establishing synchronization with the CDMA system, through combination with the system time of the LTE system.

In accordance with control by the control unit 30, the sound control unit 60 performs predetermined sound processing on a signal transmitted from the communication unit 40, and outputs the signal thus processed to the receiver 22. The receiver 22 externally outputs the signal transmitted from the sound control unit 60. It should be noted that the signal may be output from a speaker (not illustrated) in place of the receiver 22 or in addition to the receiver 22. Moreover, in accordance with control by the control unit 30, the sound control unit 60 processes a signal, which is input from the microphone 12, and outputs the signal thus processed to the communication unit 40. The communication unit 40 performs predetermined processing on the signal transmitted from the sound control unit 60, and outputs the signal thus processed from the antenna.

Next, a detailed description is provided for functions of the control unit 30.

The control unit 30 includes a synchronization unit 31 and a switching unit 32, and controls handoff from the LTE system to the CDMA system.

In a case such as handoff occurring due to power-on or movement of the cellular telephone device 1, before a location registration is performed in the LTE system, the synchronization unit 31 establishes synchronization with a base station of the CDMA system, and obtains system time of the CDMA system as synchronization information. More specifically, the synchronization unit 31 acquires the CDMA system to obtain a pilot channel and a synchronization channel (sync channel). The synchronization information represents timing for establishing synchronization with the CDMA system, and includes the aforementioned system time, PN code offset, and Walsh codes.

In a case in which a communication request occurs in the CDMA system in a state where the location registration is performed in the LTE system, based on the synchronization information obtained before the location registration is performed in the LTE system by the synchronization unit 31, the switching unit 32 establishes synchronization with a base station in a calling zone of the CDMA system corresponding to the calling zone of the LTE system, and starts communication.

In other words, in a case of responding to incoming call up of a voice call reported from the CDMA system by way of a CS Fallback function, or in a case in which an outgoing voice call is requested, the switching unit 32 establishes synchronization with the base station of the CDMA system at the timing represented by the synchronization information. By using synchronization information obtained beforehand, the time for searching for a CDMA system is shortened, and the switching unit 32 can establish communication in a short time.

Moreover, before establishing synchronization with the base station of the CDMA system, the switching unit 32 reports a communication request, i.e. an incoming call response or an outgoing call request, to the CDMA system via the LTE system. In addition, the switching unit 32 establishes synchronization with the base station by using the synchronization information of the communication channel in the CDMA system reported via the LTE system.

At this point in time, based on mapping data of the CS Fallback function, the control unit of the LTE system (hereinafter referred to as an LTE control unit) determines a calling zone of the CDMA system corresponding to the calling zone of the LTE system, and transmits and receives various types of report data in collaboration with a control unit (hereinafter referred to as a CDMA control unit) that manages this calling zone.

Figure 3:
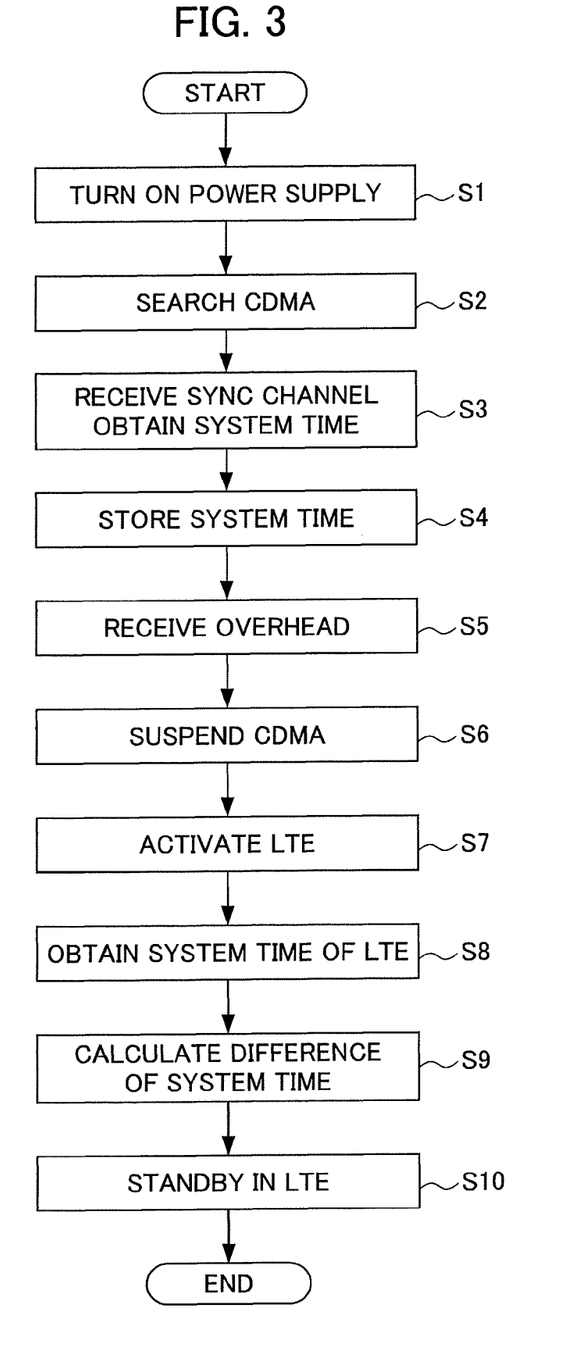
FIG. 3 is a flowchart showing processing when turning on a power supply according to the embodiment of the present invention.

FIG. 3 is a flowchart showing processing when turning on the power supply of the cellular telephone device 1 according to the present embodiment.

In Step S1, when the power supply of the cellular telephone device 1 is turned ON, the control unit 30 performs predetermined activation processing, and starts acquiring a base station and processing of location registration.

In Step S2, the control unit 30 (synchronization unit 31) searches for a CDMA system to acquire a pilot channel.

In Step S3, the control unit 30 (synchronization unit 31) establishes code synchronization with the CDMA system to receive a sync channel, and obtains the system time thereof.

In Step S4, the control unit 30 (synchronization unit 31) stores, in the storage unit 50, the system time of the CDMA system obtained in Step S3.

In Step S5, based on the system time obtained in Step S3, the control unit 30 (synchronization unit 31) establishes time synchronization with the CDMA system. In addition, the control unit 30 (synchronization unit 31) receives an overhead message of the paging channel in order to obtain a nearby channel, a base station location and the like, and further to obtain information (frequency channel, PN information, etc.) for establishing communication with the same CDMA system a subsequent time.

In Step S6, the control unit 30 suspends the CDMA system in order to activate the LTE system that is given priority over the CDMA system.

In Step S7, the control unit 30 activates the LTE system, and starts synchronization processing.

In Step S8, the control unit 30 obtains the system time of the LTE system thus synchronized.

In Step S9, the control unit 30 calculates difference between the system time of the LTE system obtained in Step S8 and the system time of the CDMA system obtained in Step S3, and stores the difference in the storage unit 50.

In Step S10, the control unit 30 enters a standby state for incoming communication in the LTE system, in which data communication can be performed in LTE, and incoming reporting of the CDMA system by the CS Fallback function can be received.

Figure 4:
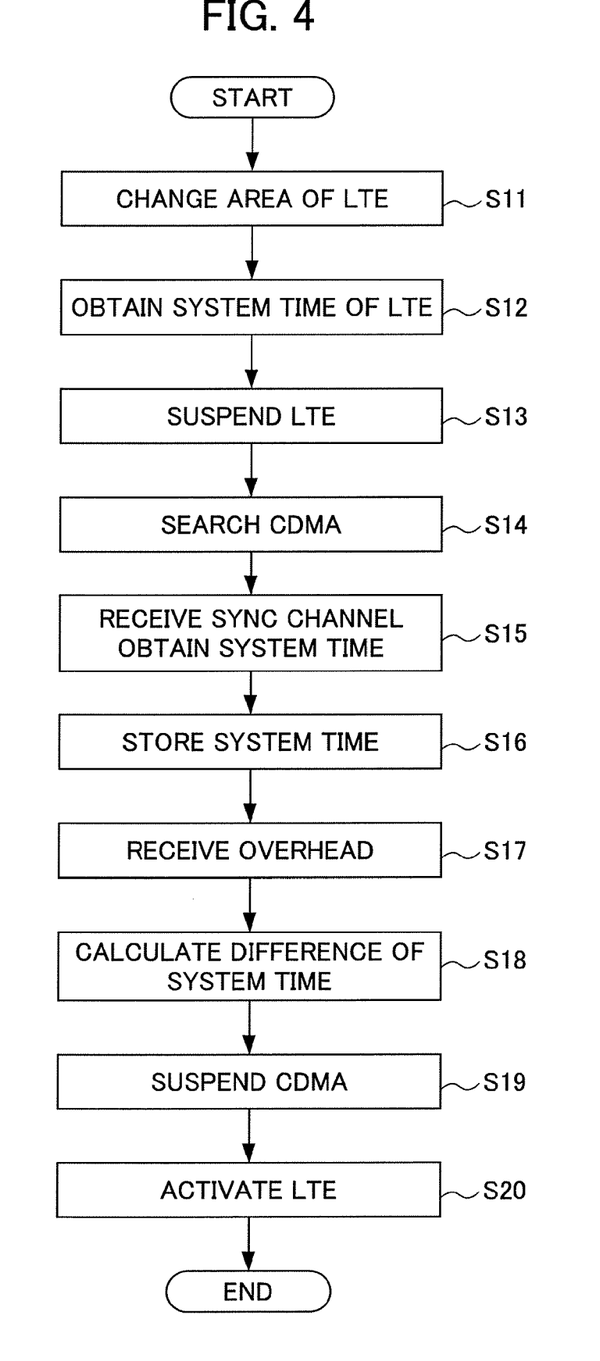
FIG. 4 is a flowchart showing processing in handoff according to the embodiment of the present invention.

FIG. 4 is a flowchart showing processing in handoff of the cellular telephone device 1 according to the present embodiment.

In Step S11, based on a change in the status of the radio waves from the base station, the control unit 30 performs handoff to change the area of the LTE system.

In Step S12, the control unit 30 obtains the system time of the LTE system as the handoff destination, and stores the system time in the storage unit 50. Furthermore, the control unit 30 may obtain a frequency and PN information of the CDMA system, which is present nearby, from the LTE system as the handoff destination.

In Step S13, the control unit 30 temporarily suspends the LTE system in order to acquire the CDMA system.

In Step S14, the control unit 30 (synchronization unit 31) searches for the CDMA system to acquire a pilot channel. It should be noted that, in a case in which the frequency and PN information of the CDMA system were obtained in Step S12, the control unit 30 (synchronization unit 31) can perform searching in a short period of time by limiting the search target to such information.

In Step S15, the control unit 30 (synchronization unit 31) establishes code synchronization with the CDMA system to receive a sync channel, and obtains the system time thereof.

In Step S16, the control unit 30 (synchronization unit 31) stores, in the storage unit 50, the system time of the CDMA system obtained in Step S15.

In Step S17, the control unit 30 (synchronization unit 31) establishes time synchronization with the CDMA system based on the system time obtained in Step S15, and receives an overhead message of the paging channel in order to obtain information (a frequency channel, PN information, etc.) for establishing communication with the same CDMA system a subsequent time.

In Step S18, the control unit 30 calculates difference between the system time of the LTE system obtained in Step S12 and the system time of the CDMA system obtained in Step S15, and stores the difference in the storage unit 50.

In Step S19, in order to activate the LTE system that was suspended in Step S13, the control unit 30 suspends the CDMA system.

In Step S20, the control unit 30 activates the LTE system to enter a standby state for incoming communication, in which data communication can be performed in LTE, and incoming reporting of the CDMA system by the CS Fallback function can be received.

It should be noted that, in this processing, the calculation of the difference of the system time (Step S18) may use the system time obtained after activating the LTE system (Step S20).

Figure 5:
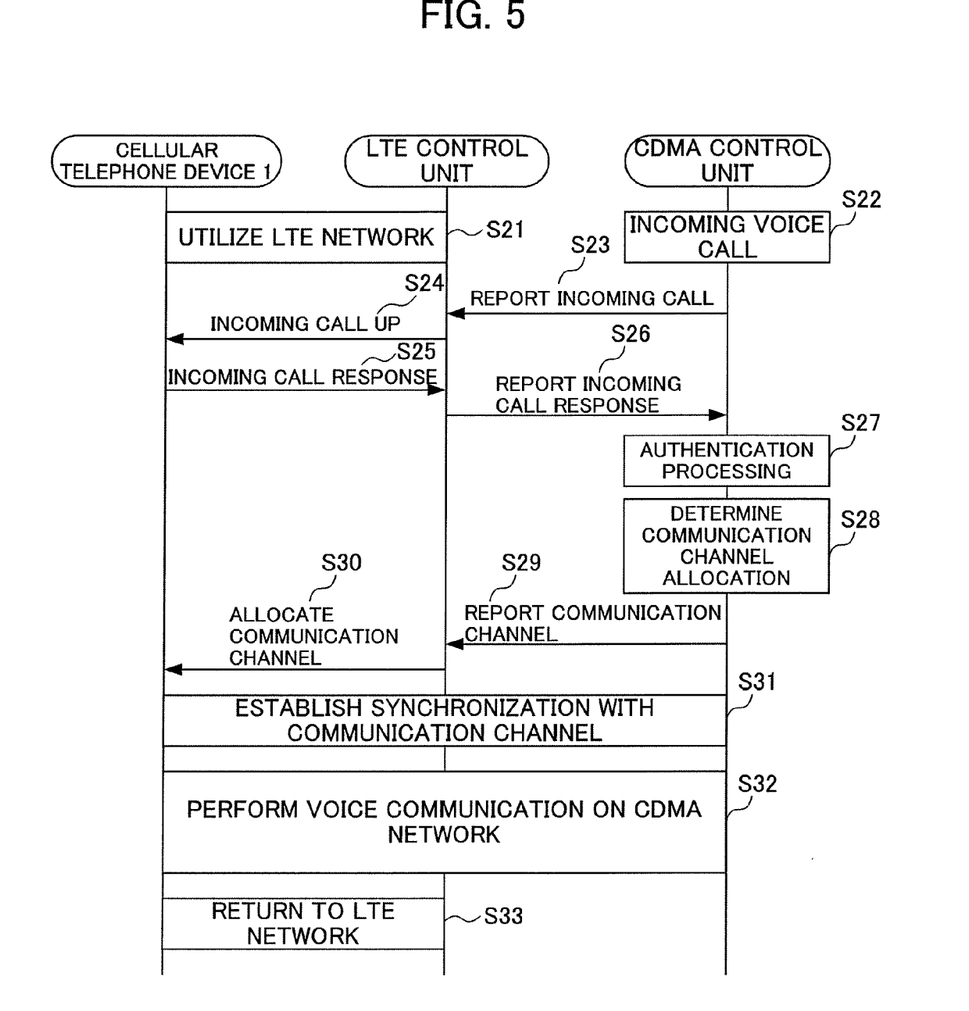
FIG. 5 is a sequence diagram showing processing in a case in which an incoming voice call occurs when utilizing a network of an LTE system according to the embodiment of the present invention.

FIG. 5 is a sequence diagram showing processing in a case in which an incoming voice call occurs when utilizing the network of the LTE system according to the present embodiment.

In Step S21, the cellular telephone device 1 is utilizing the network of the LTE system under the management of the LTE control unit.

In Step S22, the CDMA control unit receives an incoming voice call for the cellular telephone device 1 in the CDMA system.

In Step S23, the CDMA control unit reports the incoming voice call of Step S22 to the LTE control unit via CS and EPS by way of the CS Fallback function.

In Step S24, the LTE control unit performs incoming call up for the cellular telephone device 1 based on the incoming voice call reported in Step S23.

In Step S25, the cellular telephone device 1 transmits an incoming call response to the incoming call up in Step S24 to the LTE control unit.

In Step S26, the LTE control unit reports the incoming call response in Step S25 to the CDMA control unit via EPC and CS.

In Step S27, the CDMA control unit performs authentication processing to confirm that the cellular telephone device 1 that performed the incoming call response is an authorized user. It should be noted that this authentication processing is omissible.

In Step S28, the CDMA control unit determines a communication channel to be allocated in the CDMA system, such that the cellular telephone device 1 that performed the incoming call response performs a voice call.

In Step S29, the CDMA control unit reports channel information for establishing synchronization with the communication channel allocated in Step S28 to the LTE control unit via CS and EPC. More specifically, the synchronization information includes PN code offset, a frequency channel such as a band class, and identification information (Walsh code).

In Step S30, the LTE control unit reports, to the cellular telephone device 1, the channel information for establishing synchronization with the communication channel of the CDMA system reported in Step S29.

In Step S31, the cellular telephone device 1 establishes synchronization with the communication channel by using the channel information obtained in Step S30, and establishes communication with the CDMA system.

In Step S32, the cellular telephone device 1 performs voice communication on the network of the CDMA system by using the communication channel synchronized in Step S31.

In Step S33, when the voice communication in Step S32 is completed, the cellular telephone device 1 returns to the network of the LTE system that is given priority over the CDMA system.

Figure 6:
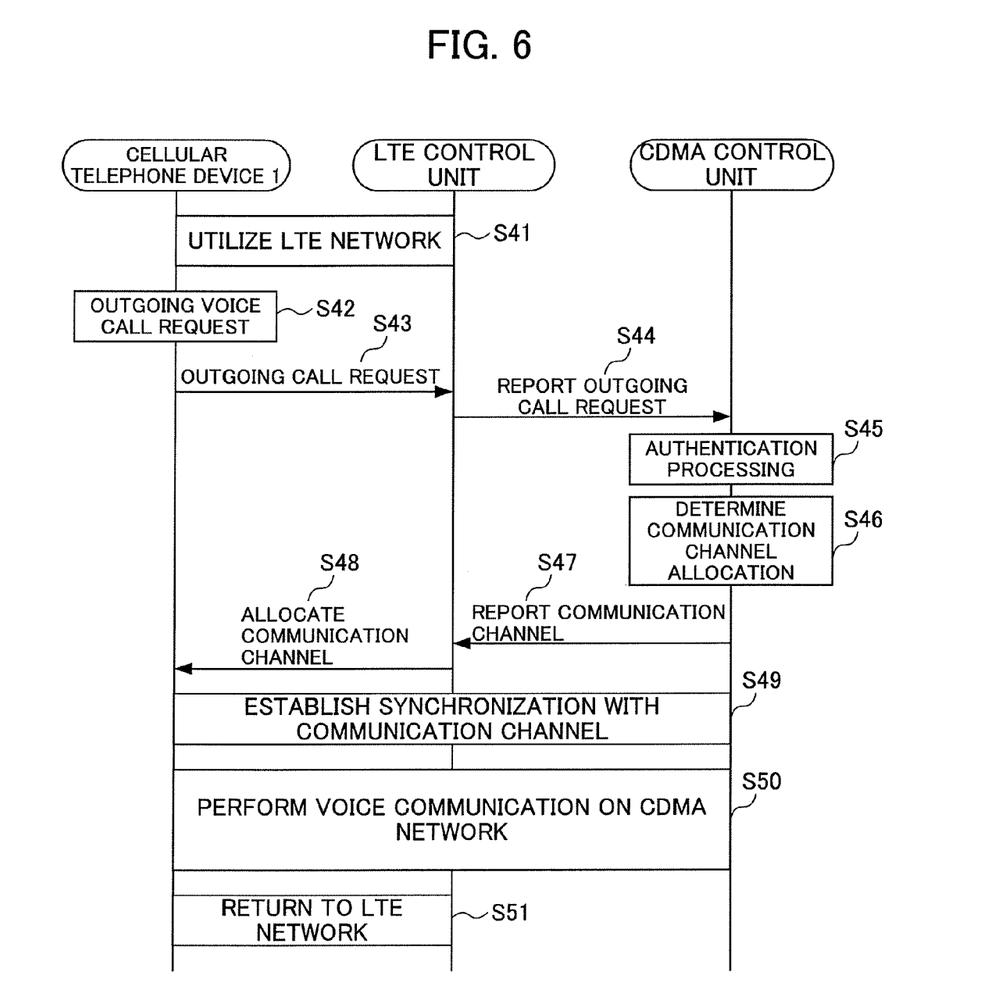
FIG. 6 is a sequence diagram showing processing in a case in which an outgoing voice call is requested when utilizing the network of the LTE system according to the embodiment of the present invention.

FIG. 6 is a sequence diagram showing processing in a case in which an outgoing voice call is requested when utilizing the network of the LTE system according to the present embodiment.

In Step S41, the cellular telephone device 1 is utilizing the network of the LTE system under the management of the LTE control unit.

In Step S42, the cellular telephone device 1 accepts an outgoing voice call request from the user via the operation unit 11 or the like.

In Step S43, the cellular telephone device 1 reports the outgoing call request accepted in Step S42 to the LTE control unit of the LTE system in which the location registration is performed.

In Step S44, the LTE control unit reports the outgoing call request of Step S43 to the CDMA control unit, which is associated by way of the mapping data, via EPS and CS.

In Step S45, the CDMA control unit performs authentication processing to confirm that the cellular telephone device 1 that performed the outgoing call request is an authorized user. It should be noted that this authentication processing is omissible.

In Step S46, the CDMA control unit determines a communication channel to be allocated in the CDMA system, such that the cellular telephone device 1 that performed the outgoing call request performs a voice call.

In Step S47, the CDMA control unit reports synchronization information for establishing synchronization with the communication channel allocated in Step S46 to the LTE control unit via CS and EPC. More specifically, the synchronization information includes PN code offset.

In Step S48, the LTE control unit reports, to the cellular telephone device 1, the synchronization information for establishing synchronization with the communication channel of the CDMA system reported in Step S47.

In Step S49, the cellular telephone device 1 establishes synchronization with the communication channel by using the synchronization information obtained in Step S48, and establishes communication with the CDMA system.

In Step S50, the cellular telephone device 1 performs voice communication on the network of the CDMA system by using the communication channel synchronized in Step S49.

In Step S51 when the voice communication in Step S50 is completed, the cellular telephone device 1 returns to the network of the LTE system that is given priority over the CDMA system.

As described above, according to the present embodiment, the cellular telephone device 1 maintains synchronization information of the CDMA system obtained before location registration is performed in the LTE system. As a result, in a case of performing handoff from the LTE system to the CDMA system when voice communication starts, the cellular telephone device 1 can establish synchronization with a communication channel without newly searching for a base station, and the period of time required for switching the communication system can be shortened.

Furthermore, when starting voice communication, the cellular telephone device 1 reports a communication request to the CDMA system via the LTE system, and obtains synchronization information of the CDMA system. As a result, the cellular telephone device 1 waits for an outgoing/incoming call on the LTE system only, and performs access processing on LTE when starting voice communication. Therefore, since the cellular telephone device 1 does not need to use a downstream paging channel and an upstream accessing channel in the CDMA system, the wireless resources can be effectively utilized.

Moreover, in the cellular telephone device 1, since a communication channel in a calling zone of the CDMA system is allocated based on the mapping data of the CS Fallback function, a communication channel with which synchronization can be established is easily determined, and the processing load is reduced.

Although an embodiment of the present invention has been described above, the present invention is not limited to the aforementioned embodiment. Moreover, the effects described in the embodiment of the present invention merely exemplify the most preferable effects arising from the present invention, and the effects according to the present invention are not limited to those described in the embodiment of the present invention.

The W-CDMA or CDMA2000_1x standard and the LTE standard in the aforementioned embodiment are merely examples, and another communication protocol may be employed. As long as collaboration is established between zones when performing a location registration, for example, a GSM standard and another standard specialized in data communication may be similarly employed.

Moreover, the wireless terminal device according to the present invention is not limited to the cellular telephone device 1. The present invention can be applied to various devices such as a PHS (trademark: Personal Handyphone System), a PDA (Personal Digital Assistant), a gaming machine, a navigation device, a personal computer, a communication-dedicated module specialized in communication functions, and the like.

What is claimed is:

1. A wireless terminal device that performs wireless communication in any one of a first communication system or a second communication system, the wireless terminal device comprising:
   a synchronization unit that establishes synchronization with a base station of the second communication system before location registration is performed in the first communication system to obtain synchronization information for establishing synchronization with the base station of the second communication system;
   a storage unit that stores the synchronization information; and
   a switching unit that establishes synchronization with the base station of the second communication system in a calling zone of the second communication system corresponding to a calling zone of the first communication system based on the synchronization information, in a case in which a communication request occurs in the second communication system after location registration is performed in the first communication system.

2. The wireless terminal device according to claim 1, wherein the switching unit reports a communication request to the second communication system via the first communication system.

3. The wireless terminal device according to claim 1, wherein the switching unit establishes synchronization with the base station by using channel information of a communication channel in the second communication system reported via the first communication system.

4. The wireless terminal device according to claim 1, wherein the switching unit establishes synchronization with the base station in a calling zone of the second communication system corresponding to a calling zone of the first communication system, based on mapping data of a CS (Circuit Switched) Fallback function maintained in the first communication system and defined in 3GPP ($3^{rd}$ Generation Partnership Project) TS 23.272.

5. A control method for a wireless terminal device that performs wireless communication in any one of a first communication system or a second communication system, the method comprising:
   a synchronizing step of establishing synchronization with a base station of the second communication system before location registration is performed in the first communication system to obtain synchronization information for establishing synchronization with the base station of the second communication system;
   a storing step of storing the synchronization information; and
   a switching step of establishing synchronization with the base station of the second communication system in a calling zone of the second communication system corresponding to a calling zone of the first communication system based on the synchronization information, in a case in which a communication request occurs in the second communication system after location registration is performed in the first communication system.

6. A control system comprising: a wireless terminal device that performs wireless communication with a base station by way of any one of a first communication system or a second communication system; a base station of each of the communication systems; and a control unit that controls wireless communication in the base station of each of the communication systems and
   the wireless terminal device including:
   a synchronization unit that establishes synchronization with a base station of the second communication system before location registration is performed in the first communication system to obtain synchronization information for establishing synchronization with the base station of the second communication system;
   a storage unit that stores the synchronization information; and
   a switching unit that establishes synchronization with the base station of the second communication system in a calling zone of the second communication system corresponding to a calling zone of the first communication system based on the synchronization information, in a case in which a communication request occurs in the second communication system after location registration is performed in the first communication system,
   wherein a control unit of the first communication system stores mapping data of a CS Fallback function defined in 3GPP TS 23.272, determines a control unit in a calling zone of the second communication system corresponding to a calling zone of the first communication system based on the mapping data, and transmits report data on the communication request from the wireless terminal device to the control unit of the second communication system, or from the control unit of the second communication system to the wireless terminal device.

* * * * *